United States Patent Office.

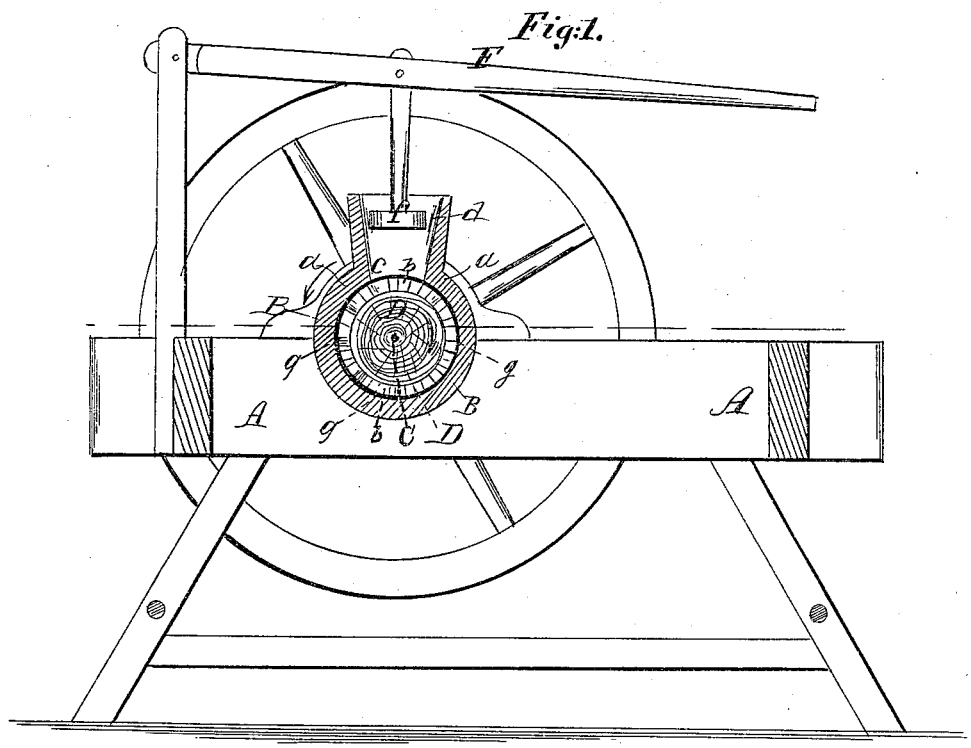
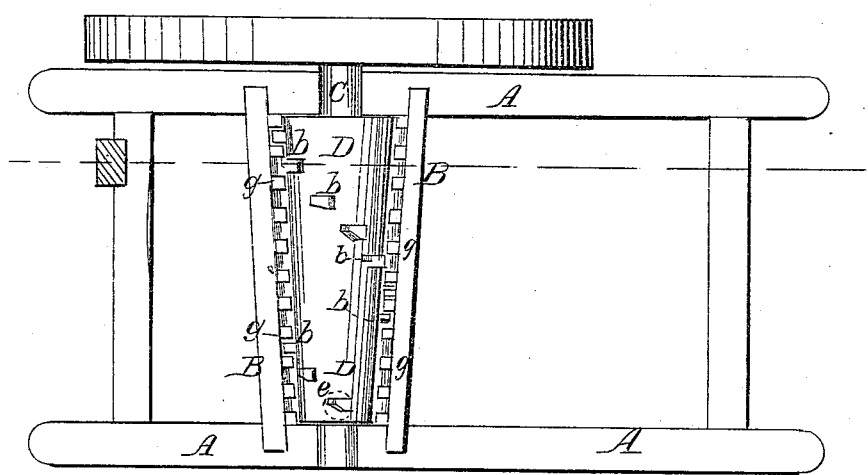

DAVENPORT ROGERS, OF MOUNT GILEAD, OHIO.

Letters Patent No. 94,033, dated August 24, 1869.

IMPROVEMENT IN BUTTER-MACHINE.

The Schedule referred to in these Letters Patent and making part of the same.

*To all whom it may concern:*

Be it known that I, DAVENPORT ROGERS, of Mount Gilead, in the county of Morrow, and State of Ohio, have invented a new and improved Butter-Machine; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved butter-machine.

Figure 2 is a plan or top view, partly in section, of the same.

Similar letters of reference indicate corresponding parts.

This invention relates to a new machine for agitating butter, after the same has been produced in a churn.

The invention consists in a novel arrangement of a conical vessel containing a revolving-toothed cone, with bevelled teeth, whereby the butter is gradually carried from one end of the vessel to the other, and thoroughly cut up and agitated during the passage.

A, in the drawing, represents a frame, of suitable size and shape, supporting a horizontal conical vessel, B, which is made of wood, or other suitable material, and which has its upper half *a* made removable, to form a lid.

In the frame are the bearings of a horizontal shaft, C, which passes lengthwise through the vessel B, as shown, and which carries within said vessel a conical block, D.

Upon the block D are fitted, in spiral lines, projecting teeth or pins, *b b*, which are bevelled toward the smaller end of the vessel B, as shown in fig. 2.

The lid *a* has an aperture, *c*, and a hopper, *d*, above it, at the large end, and the lower part of the vessel has an aperture, *e*, shown by dotted lines in fig. 2, at the small end.

The butter to be worked is put into the hopper *d*, and is forced down by a plunger, *f*, which is suspended from a lever, F, pivoted to an upright of the frame A. From the inner side of the vessel B, project teeth *g g*, which are so set as to be cleared by the teeth *b*.

The shaft is revolved in the direction of the arrow 1, its teeth and those of the vessel cutting through the butter, each tooth, as it passes through, pushing the butter slightly toward the small end of the vessel, until, finally, the butter arrives over, and is discharged through the aperture *e*.

The shaft may be revolved by hand or steam-power, or by other suitable mechanism.

A slide may be applied under the aperture *e*, to regulate the discharge, which is different in hot and cold weather.

Having thus described my invention,

What I claim as new, and desire to secure by Letters Patent, is—

1. The combination, with a hollow cylinder, having teeth *g*, and a revolving shaft, D, having the bevelled teeth *h* spirally arranged thereon, of the hopper and power-plunger, all arranged, with respect to each other, substantially as shown and described.

2. The improved hollow cylinder B, having removable top *a*, inlet-hopper *d*, and outlet-aperture *e*, all constructed and formed in one piece, as and for the purposes specified.

D. ROGERS.

Witnesses:
JOHN RUSSELL,
G. D. CROSS.